(12) United States Patent
Wada

(10) Patent No.: US 6,805,276 B2  
(45) Date of Patent: Oct. 19, 2004

(54) DEPOSIT METAL WELDING METHOD

(75) Inventor: Kazumi Wada, Kanagawa (JP)

(73) Assignee: ECI, Versailles (FR)

(*) Notice: Subject to any disclaimer, the term of this patent is extended or adjusted under 35 U.S.C. 154(b) by 60 days.

(21) Appl. No.: 10/143,558

(22) Filed: May 10, 2002

(65) Prior Publication Data

US 2003/0209591 A1 Nov. 13, 2003

(30) Foreign Application Priority Data

May 11, 2001 (JP) ......................................... 2001-141069

(51) Int. Cl.[7] .......................... B23K 31/02; B32B 15/02
(52) U.S. Cl. .................. 228/155; 228/199; 228/234.3; 428/615
(58) Field of Search .......................... 228/155, 141.1, 228/199, 234.3, 256; 428/544, 615

(56) References Cited

U.S. PATENT DOCUMENTS

| | | | |
|---|---|---|---|
| 4,348,131 A | * | 9/1982 | Shimanuki et al. |
| 5,134,267 A | * | 7/1992 | Atsumi et al. |
| 5,742,020 A | * | 4/1998 | Adachi et al. |
| 5,759,299 A | * | 6/1998 | Yokoyama et al. |
| 5,964,964 A | * | 10/1999 | Kurebayashi et al. |
| 6,126,208 A | * | 10/2000 | Asada et al. |
| 6,223,974 B1 | * | 5/2001 | Unde ......................... 228/199 |

FOREIGN PATENT DOCUMENTS

| | | | |
|---|---|---|---|
| JP | 355084273 A | * | 6/1980 |
| JP | 357001573 A | * | 1/1982 |
| JP | 410146688 A | * | 6/1998 |
| JP | 410296461 A | * | 11/1998 |
| SU | 995991 A | * | 2/1983 |

OTHER PUBLICATIONS

Translation of JP–410296461A.*

* cited by examiner

Primary Examiner—Kiley Stoner  
(74) Attorney, Agent, or Firm—Harrington & Smith, LLP

(57) ABSTRACT

To prevent decreases in fatigue strength of a base material by relieving the residual stress of a weld. A method for welding a deposit metal to a base material with reduced residual stress, comprising a step of welding a deposit metal to a base material; and a step of plastically deforming into a recess, an area on the surface of the base material around a peripheral portion of the deposit metal. The invention is also directed to a welded block joint between a wire and a base material, characterized by comprising a deposit metal receiving an end portion of the wire and welded to the base material, wherein an area which is plastically deformed into a recess is formed on the base material surface at a peripheral portion of the deposit metal.

13 Claims, 3 Drawing Sheets

[Fig. 1]
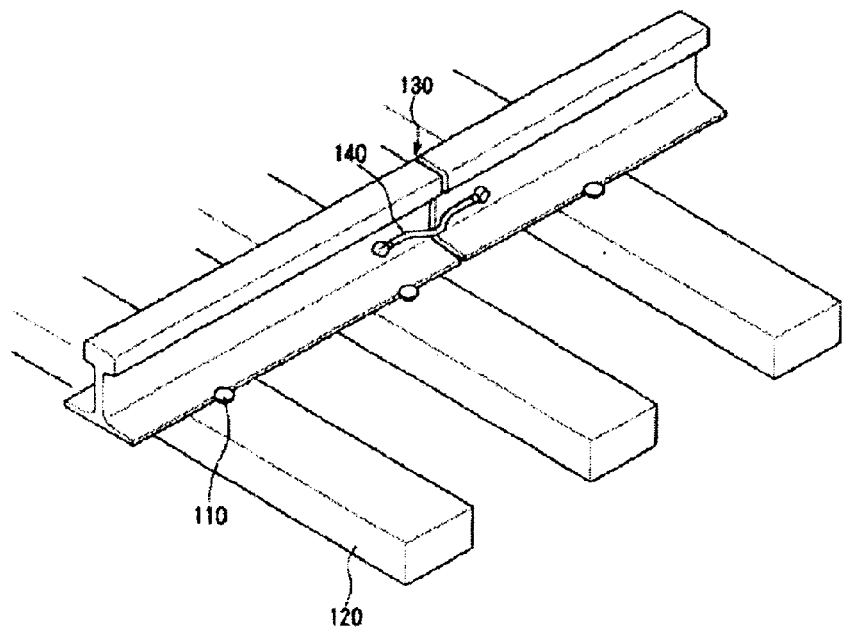
[Fig. 2]
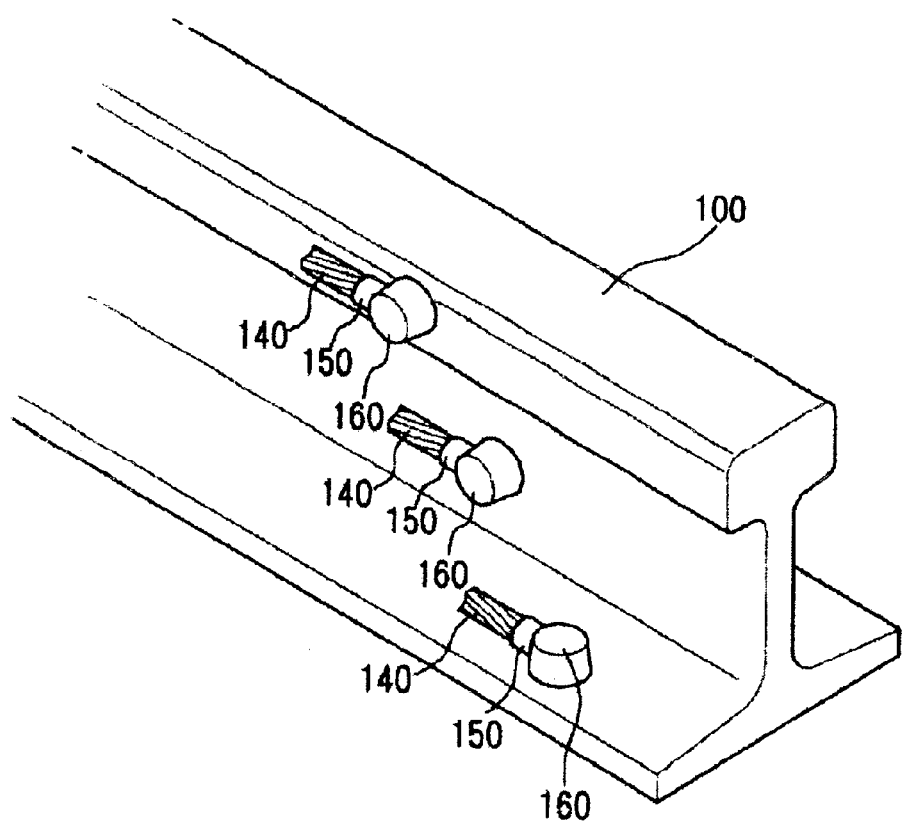

[Fig. 3]
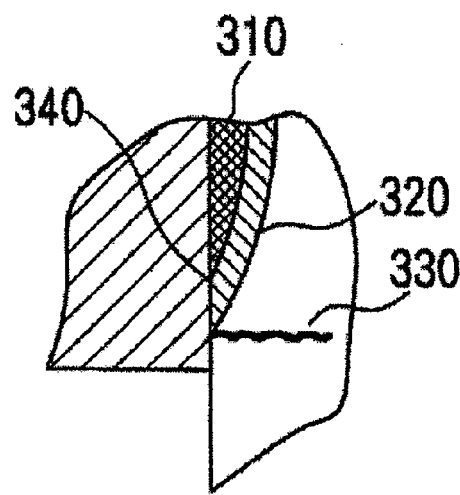
[Fig. 4]
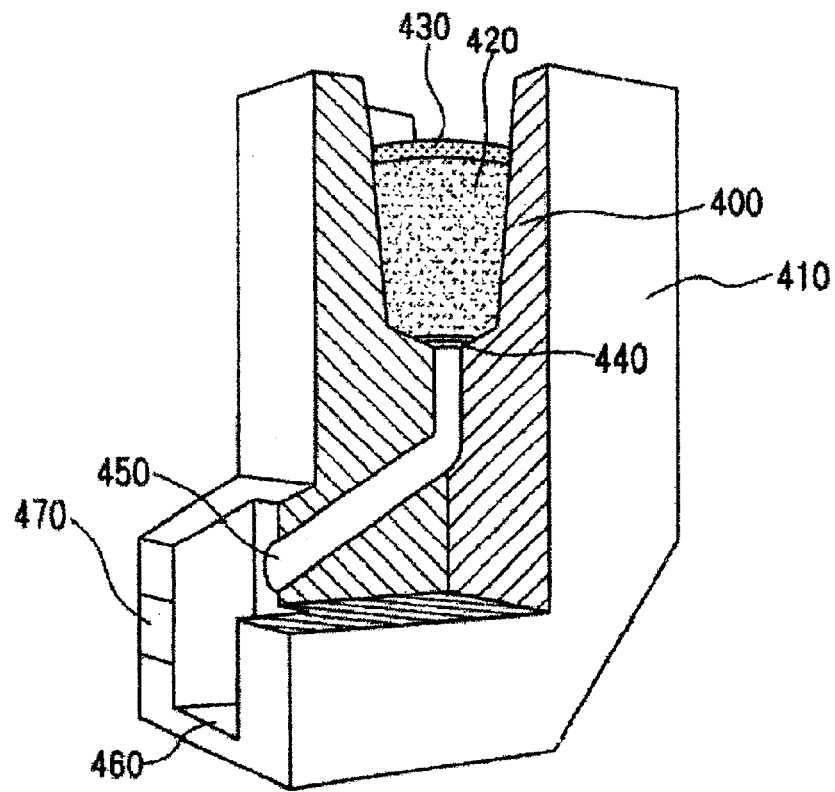

[Fig. 5]
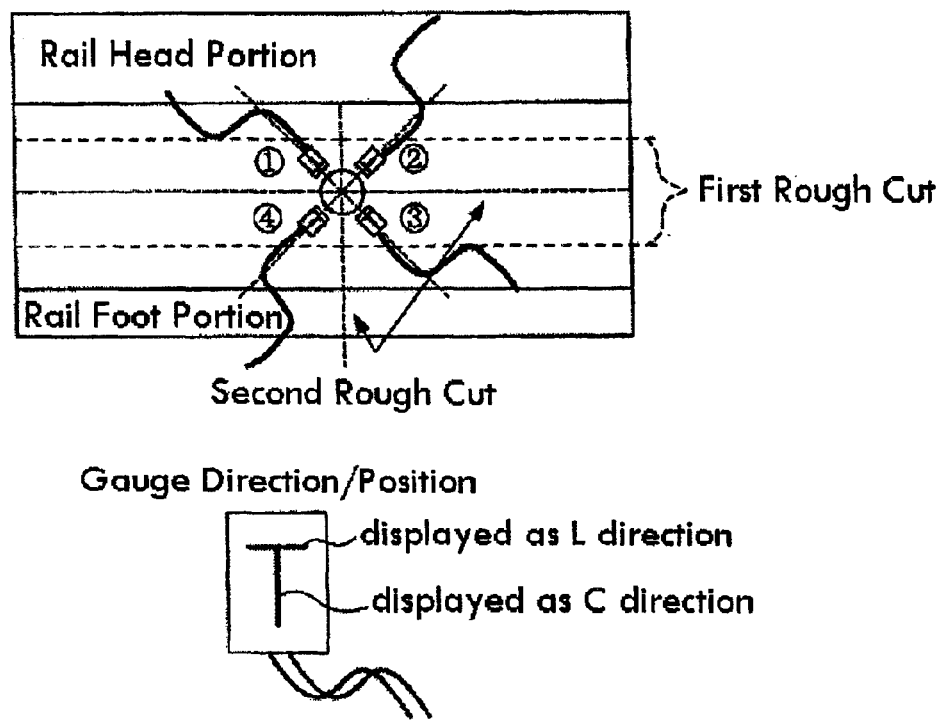

DEPOSIT METAL WELDING METHOD

DETAILED DESCRIPTION OF THE INVENTION

1. Technical Field of the Invention

The present invention relates to a method for welding a base material and a deposit metal, and particularly relates to a welding method for reducing the residual stress after welding a deposit metal to a base material, and increasing the fatigue strength of a base material and welded joint portion.

2. Conventional Art

Herebelow, a summary of the conventional art shall be described with the welding of a bond cable for a railroad rail. FIG. 1 schematically illustrates a joint portion of a railroad rail. While the rail 100 which is anchored to a tie 120 by means of a spike 110 is such that a predetermined gap 130 with an adjacent rail is left in order to allow for thermal expansion, they are connected to each other electrically by means of bond cables 140. This is because the rails 100 are also used as channels for passing the drive current and control signals of railway cars.

FIG. 2 is a perspective view showing an enlargement of the area of attachment of the bond cables 140. In the example shown, the end portion 150 of the bond cable is welded to a web on the rail 100 by means of a deposit metal 160. The procedure for welding the deposit metal 160 to the web on the rail 100 is performed on-site after the rail 100 has been lain. Examples of methods for performing the weld include many types such as low-temperature wax welding, arc welding and others, with many procedures having been proposed, but of these, copper thermit welding has the highest joint strength at the welding portion yet does not require high levels of skill, and has consequently come into popular use in recent years.

Thermit welding is a method wherein a mixed powder of aluminum and copper oxide (or iron oxide) is ignited near the surface of the base material, to melt and weld the copper (or iron) and a portion of the base material with the heat of the chemical reaction.

PROBLEMS TO BE SOLVED BY THE INVENTION

Although thermit welding is a welding method which is convenient and can achieve high strength as described above, it leaves residual stress in the area of the weld, thus decreasing the fatigue strength. For example, as described in Miki et al., <<Methods of Increasing Fatigue Strength by Improvements to Weld Toe Portion>>, *Journal of Japan Welding Society*, vol. 17, no. 1, reduction of the stress concentration at the weld toe portion and reduction of tensile residual stress caused by welding are known to be effective for improving the fatigue strength of weld joints. Additionally, this paper also describes that hammer peening, in addition to TIG treatments and grinder treatments, have some effect as methods for relieving this stress.

Hammer peening is a method in which the weld portion is struck by a hammer to plastically deform the base material, and the tensile residual strength of the weld is relieved by the residual strength on the pressed side caused by this deformation, so as to consequently lessen the decrease in the fatigue strength caused by the weld. As described in the paper, in the hammer peening process, the blows are struck at the peripheral portions of the weld where the residual tensile strength is believed to be highest. While this hammer peening process can raise the fatigue strength to some extent, there are reports that fatigue cracks can develop from scratches formed in the base material during the hammer peening process.

BRIEF DESCRIPTION OF THE DRAWINGS

FIG. 1 A perspective view of a joint portion of a rail.

FIG. 2 An enlarged perspective view of the area around a bond cable attachment portion.

FIG. 3 A section view showing schematically the area around the weld portion.

FIG. 4 A conceptual diagram of a thermit weld apparatus.

FIG. 5 A drawing showing the positions of strain gauges for measuring residual stress.

MEANS FOR SOLVING THE PROBLEMS

On the basis of numerous welding tests, residual stress measurements and fatigue tests, the inventors discovered that tensile stress $S_T$ resides in the peripheral areas of a heat-affected portion 320 surrounding the weld portion 310, and that this tensile stress $S_T$ is closely connected to decreases in the fatigue strength and occurrence of cracks 330. Additionally, they discovered that the residual tensile stress can be effectively relieved by pressing (or peening) not the peripheral areas of the heat-affected portion where the residual tensile stress is highest, but the area around the peripheral portions of the deposit metal, and that reductions in the fatigue strength due to welding can thereby be prevented.

Therefore, the inventors propose a method for welding a deposit metal to a base material with reduced residual stress, characterized by comprising a step of welding a deposit metal to a base material; and a step of plastically deforming, into a recess, an area on the surface of the base material around a peripheral portion of the deposit metal. According to this method, it is possible to convert the tensile stress, particularly in the radial direction, generated in the area around the peripheral portions of the deposit metal into compressive stress, due to the plastic deformation of the area around the peripheral portion of the deposit metal into a recess.

In particular, if the above weld has been made by means of thermit welding, the weld portion and heat-affected portion of the base material should lie underneath the deposit metal as shown schematically in FIG. 3, so that the peripheral portions of the heat-affected portion cannot be directly pressed or peened. Since it is sufficient for the purposes of the present invention to strike the base material surface in the areas around the peripheral portions of the deposit metal, for example, the outer portions of the surface of the base material such as to surround the deposit metal, the method can be applied under such conditions without any problem.

Additionally, if sharp grooves which can be the cause of fatigue cracks are prevented from being made by striking the base material with a tipped tool having a dome-shaped tip when forming the recessed plastic deformation, then the fatigue strength can be improved even further.

EMBODIMENTS OF THE INVENTION

Herebelow, embodiments of the present invention shall be described in detail with reference to the attached drawings;

FIG. 4 is a conceptual drawing showing an example of a thermit welding apparatus. In the orifice portion 410 of the main body 400 which also functions as a crucible are put a thermit agent 420 to be described below and an ignition agent 430 to cover the thermit. In the initial state, the bottom of the orifice portion 410 is covered by a steel disk 440, and a runner 450 extends from underneath.

When the ignition agent 430 is lit, the thermit agent 420 undergoes a combustion reaction such as indicated below (the example shows that of a copper thermit weld), and the heat generated at this time melts the metal components in the thermit agent 420.

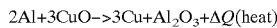

$$2Al + 3CuO \rightarrow 3Cu + Al_2O_3 + \Delta Q (\text{heat})$$

At the same time, the steel disk 440 also melts, thus passing the molten metal to the runner 450 and allowing it to run down. Therefore, by attaching to the outlet portion 460 of the runner 450, for example, a bond terminal portion 470 and a base material to be welded so as to cover the outlet portion 460, the molten metal will partially melt these so that in the end, the molten metal (an alloy mainly composed of copper in the example) containing the bond terminal portion 460 will be welded to the base material.

When actually welding the thermit, work such as polishing of the base material, preheating, attachment of weld materials or the like, ignition and combustion of the thermit agent, detachment of the main body, removal of slag and shaping are necessary, but these are already known to those skilled in the art and so their detailed description shall be omitted.

Table 1 shows the results of measurements of residual stress taken immediately after a molten metal was welded with a short rail as the base material, and measurements of residual stress taken after having applied the method of the present invention by using a tipped tool having a dome-shaped tip to strike the base material and form a recessed portion. The attached positions and orientations of the strain gauges used for the measurements are shown in FIG. 5.

TABLE 1

Comparison of Cases of Residual Stress Measurements Immediately After Copper Thermit Wleding and Stress Relief Method (Normal Striking Force) Based on Present Invention
STRESS MEASUREMENT RESULTS

| Measured Area | | Weld Only | | Stress Relief After Weld | |
| --- | --- | --- | --- | --- | --- |
| | | Strain | Residual Stress | Strain | Residual Stress |
| (1) | L | −377 | 19.3 | 712 | −18.1 |
| | C | −1538 | 38.1 | 246 | −10.6 |
| (2) | L | −7 | 5.8 | 839 | −34.3 |
| | C | −808 | 18.7 | 2155 | −55.5 |
| (3) | L | 239 | 6.6 | −29 | −5.3 |
| | C | −1744 | 38.6 | 863 | −19.7 |
| (4) | L | 311 | 1.6 | 1136 | −23.1 |
| | C | −1263 | 2.70 | −453 | 2.6 |

As shown in Table 1, when a copper thermit weld is performed without also performing the stress relief procedure according to the present invention, the tensile stress component (positive value) particularly in the radial direction (C direction) centered on the weld portion is large, and tensile stress also appears in the circumferential direction. In contrast, when performing a stress relief procedure after copper thermit welding according to the present invention, almost all of the residual stress in the radial and circumferential directions is seen to be replaced with compressive stress. That is, the results of this test show that the method of the present invention can be used to effectively release the residual stress of the weld, while in turn leaving some residual stress of compression in the area around the weld portion.

Furthermore, a fatigue test was performed under the conditions shown in Table 2 with respect to a sample on which a molten metal weld was performed using a rail material thermally treated to improve the wear resistance (HH340) according to the weld method of the present invention, thereby to observe the conditions for occurrence of cracks and the like.

TABLE 2

FATIGUE TEST CONDITIONS

| | Stress Amplitude (N/mm$^2$) | | |
| --- | --- | --- | --- |
| Sample No. | Principal Stress | Shear Stress | No. of Repetitions |
| 1 | 111.8 | 163.8 | 2 × 10$^6$ |
| 2 | 119.6 | 169.7 | 2 × 10$^6$ |
| 3 | 117.7 | 136.3 | 2 × 10$^6$ |

The results of the fatigue test confirmed that the occurrence of cracks cannot be observed by the naked eye.

The above-given experimental results indicate that sufficient fatigue strength can be obtained by applying the present invention even in cases where a thermit weld is combined with a rail material (HH rail) which has undergone a thermal treatment for wear resistance which is believed to have the possibility of bringing about a considerable loss of fatigue strength. Additionally, the conditions for the fatigue test shown in Table 2 were obtained by multiplying a design safety factor to repetitive stress conditions which are applied to railroad rails over prolonged use, and show that a weld portion applying the present invention is adequate to satisfy actual design conditions.

While preferred embodiments of the present invention have been described in detail with reference to the drawings above, the drawings and above description are merely examples, and the present invention is not to be construed as being in any way restricted by these embodiments.

DESCRIPTION OF REFERENCE NUMBERS

| | |
| --- | --- |
| 100 | railroad rail |
| 140 | bond cable |
| 160 | deposit metal |
| 310 | melt portion |
| 320 | heat-affected portion |
| 330 | crack |
| 400 | main body |
| 410 | recessed portion |
| 420 | thermit agent |
| 430 | ignition agent |
| 440 | steel desk |
| 450 | runner |

What is claimed is:

1. A method for welding a deposit metal to a base material with reduced residual stress, characterized by comprising:
    a step of welding a deposit metal to a base material; and
    a step of plastically deforming an area on the surface of the base material to form a recess in the base material around a peripheral portion of the deposit metal, wherein said plastic deformation step is performed after said welding step.

2. A method for welding a deposit metal to a base material with reduced residual stress, characterized by comprising:

a step of welding a deposit metal to a base material; and a step of plastically deforming, into a recess, an area on the surface of the base material around a peripheral portion of the deposit metal, wherein the area around the peripheral portion which is plastically deformed into a recess lies further to the outside than a heat-affected portion formed outside a melt portion which is melted during the weld.

3. A method for welding a deposit metal to a base material with reduced residual stress, characterized by comprising:

a step of welding a deposit metal to a base material; and a step of plastically deforming, into a recess, an area on the surface of the base material around a peripheral portion of the deposit metal, characterized in that said base material is a rail material which has been thermally treated to improve wear resistance.

4. A method as recited in claim 1, characterized in that said deposit metal is composed substantially of copper.

5. A method for welding a deposit metal to a base material with reduced residual stress, characterized by comprising:

a step of welding a deposit metal to a base material; and a step of plastically deforming, into a recess, an area on the surface of the base material around a peripheral portion of the deposit metal, characterized in that said welding step is a thermit welding step.

6. A method as recited in claim 5, wherein the deposit metal is deposited by said thermit welding so as to cover over the melt portion and the heat-affected portion, and the area around the peripheral portion which is plastically deformed into a recess is a portion which lies to the outside of the heat-affected portion and is not covered by the deposit metal.

7. A method as recited in claim 1, characterized in that said plastic deformation step comprises a step of striking the base material with a tipped tool having a dome-shaped tip.

8. A method for welding a deposit metal to a base material with reduced residual stress, characterized by comprising:

a step of welding a deposit metal to a base material; and a step of plastically deforming, into a recess, an area on the surface of the base material around a peripheral portion of the deposit metal, characterized in that said base material is a rail for a railroad, and said deposit metal receives an end portion of a bond cable and electrically connects the bond cable to a rail.

9. A welded block joint between a wire and a base material, characterized by comprising a deposit metal receiving an end portion of the wire and welded to the base material, wherein an area which is plastically deformed into a recess is formed on the base material surface at a peripheral portion of the deposit metal.

10. A welded block joint as recited in claim 9, characterized in that a heat-affected portion is formed around the weld portion, and said recessed area is formed therearound.

11. A welded block joint as recited in claim 9, characterized in that said base material is a rail which has been thermally treated to improve wear resistance.

12. A welded block joint as recited in claim 9, characterized in that said deposit metal is mainly comprised of copper.

13. A welded block joint as recited in claim 9, characterized in that substantial compressive stress remains in said weld portion and said heat-affected portion.

* * * * *